(12) United States Patent
Krohmer et al.

(10) Patent No.: US 9,802,333 B1
(45) Date of Patent: Oct. 31, 2017

(54) SIGN MAKING APPARATUS AND METHOD

(71) Applicant: Rockler Companies, Inc., Medina, MN (US)

(72) Inventors: Steve D. Krohmer, Coon Rapids, MN (US); Daniel P. Banasik, Eagan, MN (US)

(73) Assignee: Rockler Companies, Inc., Medina, MN (US)

(*) Notice: Subject to any disclaimer, the term of this patent is extended or adjusted under 35 U.S.C. 154(b) by 899 days.

(21) Appl. No.: 14/207,865

(22) Filed: Mar. 13, 2014

Related U.S. Application Data

(60) Provisional application No. 61/794,392, filed on Mar. 15, 2013.

(51) Int. Cl.
B43L 13/20 (2006.01)
B27C 5/10 (2006.01)
B23Q 35/42 (2006.01)

(52) U.S. Cl.
CPC ............... B27C 5/10 (2013.01); B23Q 35/42 (2013.01); B43L 13/208 (2013.01)

(58) Field of Classification Search
CPC .................................................... B43L 13/208
USPC ................ 33/562, 564, 566; 144/371, 372
See application file for complete search history.

(56) References Cited

U.S. PATENT DOCUMENTS

| | | | | |
|---|---|---|---|---|
| 159,725 A | * | 2/1875 | Warren | B43L 13/208 101/128 |
| 1,703,246 A | * | 2/1929 | Read | B05C 17/06 101/112 |
| 2,041,993 A | * | 5/1936 | Cousins | B43L 13/208 33/564 |
| 2,850,811 A | * | 9/1958 | Boley | G09B 11/04 33/564 |
| 3,140,548 A | * | 7/1964 | Paparozzi | B43L 13/208 33/564 |
| 3,584,385 A | * | 6/1971 | Booth | B43L 13/208 101/128 |
| 4,125,658 A | * | 11/1978 | Miles | B43L 13/208 101/127 |
| 4,652,337 A | * | 3/1987 | Picone | B05C 17/06 101/128.21 |
| 4,731,149 A | | 3/1988 | Dowzall et al. | |
| 4,852,483 A | * | 8/1989 | Bussard | B41F 15/02 101/114 |
| 4,862,597 A | * | 9/1989 | Drandell | B43L 13/208 33/565 |
| 4,867,056 A | | 9/1989 | Anderson et al. | |
| 4,916,826 A | * | 4/1990 | McKeown | B43L 13/208 33/564 |

(Continued)

FOREIGN PATENT DOCUMENTS

GB 2071579 A * 9/1981 ............ B43L 13/208

Primary Examiner — Christopher Fulton
(74) Attorney, Agent, or Firm — James L. Young; Westman, Champlin & Koehler, P.A.

(57) ABSTRACT

A kit for making a sign utilizing a router includes a plurality of interlocking templates that can be utilized to form the letters for a sign. The kit includes two or more templates that are positioned in the same location on a board in a sequence to form a single letter, number or symbol with an island with an uninterrupted perimeter. The kit also includes a guide bushing that is secured to the router bit to prevent the router bit from gouging into the templates.

7 Claims, 4 Drawing Sheets

(56) References Cited

U.S. PATENT DOCUMENTS

| | | | |
|---|---|---|---|
| 5,000,688 A * | 3/1991 | Clamp | G09B 11/04 |
| | | | 101/127 |
| 5,761,060 A | 6/1998 | Drew | |
| 6,686,935 B1 | 2/2004 | Richard | |
| 6,829,748 B1 | 12/2004 | Browne et al. | |
| 7,020,975 B2 | 4/2006 | Ernst et al. | |
| 8,044,961 B2 | 10/2011 | Opstad et al. | |
| 8,069,091 B1 | 11/2011 | Callen et al. | |
| 2014/0014233 A1* | 1/2014 | Grisley | B27F 1/12 |
| | | | 144/372 |

* cited by examiner

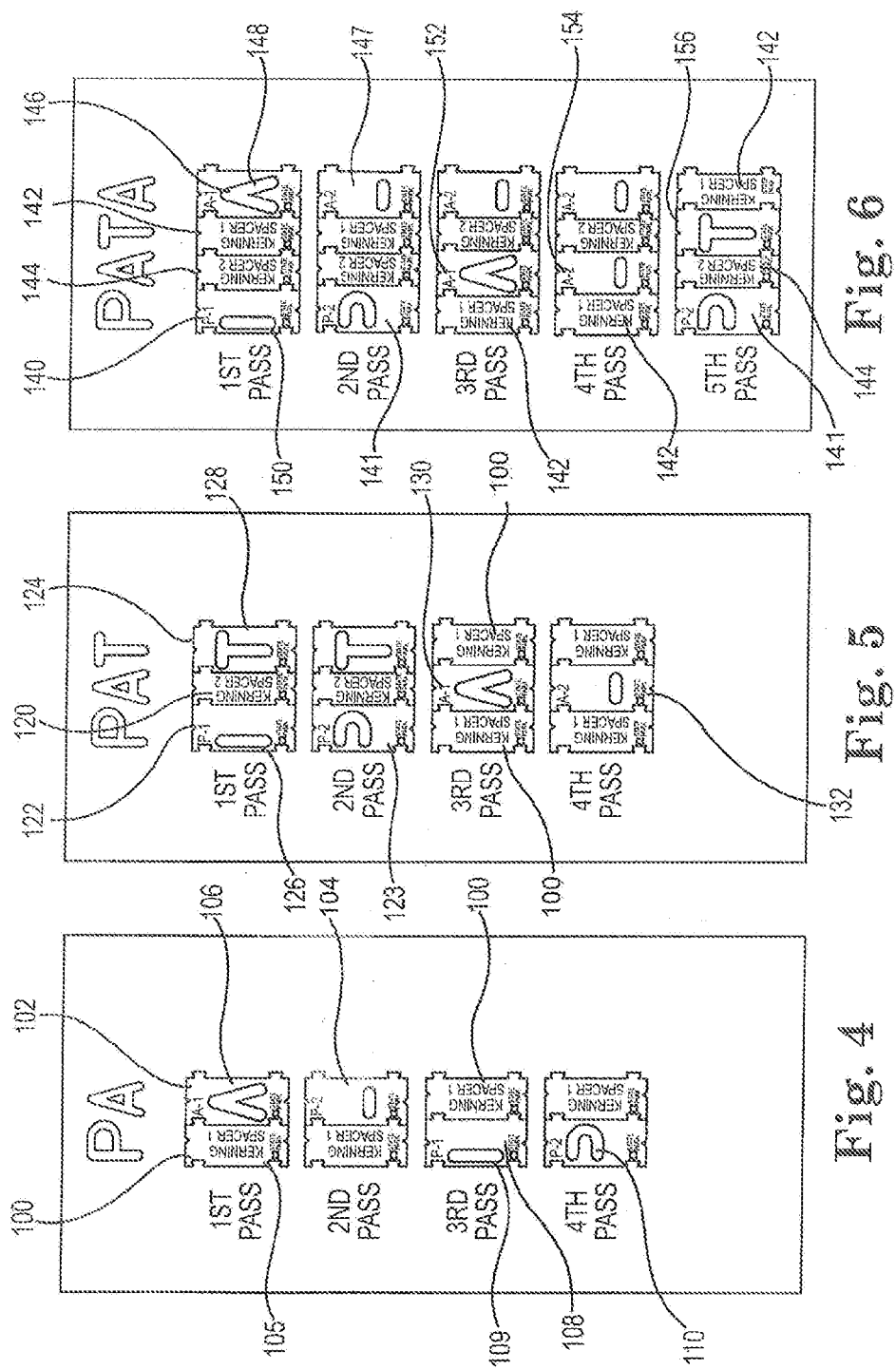

SIGN MAKING APPARATUS AND METHOD

CROSS-REFERENCE TO RELATED APPLICATION

The present application is based on and claims the benefit of U.S. provisional patent application Ser. No. 61/794,392, filed Mar. 15, 2013, the content of which is hereby incorporated by reference in its entirety.

BACKGROUND

The present disclosure relates an apparatus and method of making a sign utilizing a router. More particularly, the present disclosure relates to an apparatus and method of making a sign utilizing a kit that includes a plurality of templates that allows for the kerning of letters within a word and also for utilizing a sequence of different templates to form a single letter with an uninterrupted island.

Many people who enjoy woodworking like to make signs where the letters, numbers and/or symbols are routed into the wood. Typically, a single template is utilized to define the look and appearance of each letter, number and/or symbol. The templates are configured to be placed side by side where each template typically has the same length and width about the perimeter of the template.

Using templates of the same length and width ensures the template spacing is uniform. While the template spacing maybe uniform, there are many times in which it may be beneficial to include varying spacing between the letters to provide a more visually appealing and professional appearance.

The kerning of the letters may be utilized to provide a more professional appearance. What is meant by kerning is changing the spacing between letters within a word. Letters that typically could require kerning include A, F, L, P, T, V and Y. Each of these letters has a characteristic where there is a difference in the width of the letter at the top versus the bottom. One of the more pronounced examples would be when the letters A and V which have complementary slanted segments that are placed adjacent each other. Utilizing a typical template to make the signs, the letters A and V would be spaced further apart than necessary and would provide a less professional appearance.

There also are letters or symbols that include islands that are difficult to make utilizing a router. What is meant by an "island" is a portion of a letter, number or symbol that is completely surrounded by a routed groove. A non-exhaustive list of letters of the English alphabet, symbols and numbers that have an island include A, B, D, O, P, Q, R, 4, 6, 8, 9, 0, #, &, and @. In order to route these symbols, numbers and letters into a piece of wood, a split in the island perimeter is typically utilized where one or more bridges connect the island to the rest of the template. As such, the perimeter around the island is not continuous resulting in the letter, number or symbol not having as clean or a professional appearance when compared to that of a typical letter, where the island has an uninterrupted perimeter.

SUMMARY

The present disclosure includes a kit for making a sign utilizing a router. The kit includes a plurality of interlocking templates that can be utilized to form the letters for a sign. The kit includes two or more templates for individual letters, numbers and symbols having an island. The two or more templates for the single letter, number or symbol with an island are sequentially positioned in the same location on a board and routed to form the letter, number or symbol with an island with an uninterrupted perimeter. The first template is utilized to route a first portion of the letter, number or symbol where the first template including a first portion of a surface that defines the island. After the first portion has been routed into the wood, the first template is removed and second template is positioned in the same location as the first template. The second template includes a second portion of the letter, number or symbol and includes a second portion of the surface that defines the island. The second template provides overlap with the previously cut first portion such that the router bit can be positioned in the first groove prior to forming the second portion. The router is then utilized to cut the second part of the letter, number and/or symbol such that the letter, number or symbol has an island with an uninterrupted perimeter. The kit also includes a guide bushing that is secured to the router bit that guides the router bit in the template grooves to prevent the router bit from gouging into the templates.

The present disclosure also includes a method of making a sign. The method includes identifying the letters that are going to be used to create the sign, identifying which letters require a multi-pass approach to route the letters into the workpiece with an uninterrupted island, and identifying which letters require kerning. The sequence of the passes required to make the sign are then determined. In the event that letters, numbers or symbols have an island, multiple templates are utilized in sequence at the same location to create the letter, number or symbol, such that the island has a continuous perimeter. Where letters that require kerning are utilized within a word, either a first narrow kerning spacer or a second larger kerning spacer is utilized as a blank between two letters. The first and second kerning spacers have widths that are less than a width of a standard template. Therefore, when utilizing kerning to create a word or sequence, more passes are required than words that are being routed into the piece of wood without kerning.

BRIEF DESCRIPTION OF THE DRAWINGS

FIG. 4 is a schematic illustration of a method of routing a two letter sequence of letters with kerning between the two letters where each letter has an island.

FIG. 5 is a schematic illustration of a method of routing a three letter sequence of lettering with kerning where two of the letters include an island.

FIG. 6 is a schematic illustration of a method of routing a four letter sequence of lettering with kerning where three of the four letters include an island.

DETAILED DESCRIPTION OF ILLUSTRATIVE EMBODIMENTS

Figure 1:
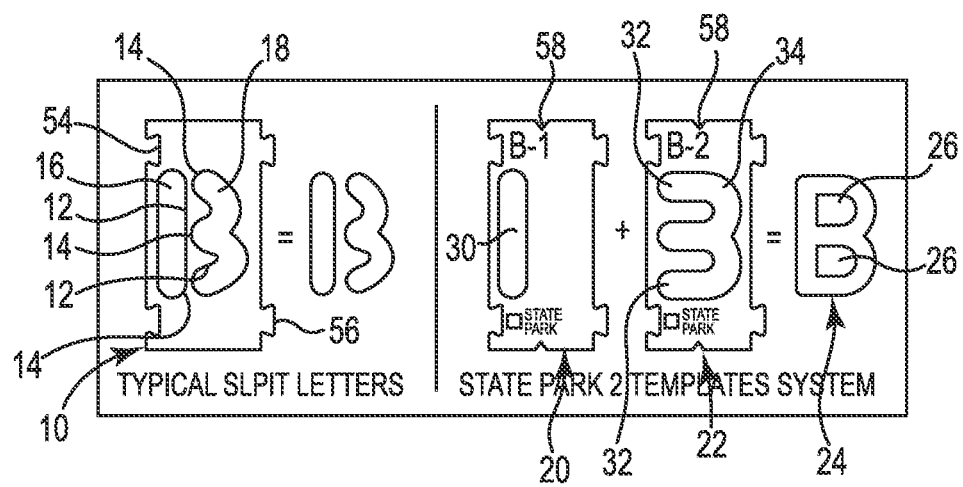
FIG. 1 is a comparative illustration of routed letters on a sign having islands utilizing a template with a split letter versus routing a letter utilizing a sequence of templates and multiple router passes to create an island with a continuous perimeter.

The present disclosure includes a kit having an interlocking template system having a plurality of templates including multiple templates that are used to form a single letter, number or symbol having an island with an uninterrupted perimeter. Referring to FIG. 1, a typical template 10 for a letter, number or symbol with an island 12 is illustrated and has a split letter design because the island 12 does not have a continuous perimeter, but rather requires a bridge 14 between the two sections 16 and 18. Without the bridge 14, the template 10 for the island 12 would be disconnected from the remaining part of the template. However, templates with the split letters can be utilized with the kerning function described herein.

With the disclosed kit 10, instead of using a split letter template 10, a sequence of templates 20 and 22 are utilized to form letters, numbers and symbols with islands. For instance as illustrated in FIG. 1, the letter "B" has two islands. The letter 24 "B" produced by using the templates 20 and 22 in sequence has a continuous smooth island 26 which provides a more pleasing and professional appearance.

By way of example, the letter B is formed by locating a position of the first template 20 on a workpiece, that is typically a piece of wood. However, other materials are also contemplated.

The first template 20 includes a vertical space 30 that correlates to the back vertical line of the letter B. The vertical space 30 includes portions of both islands 26. Once the vertical line 30 has been routed into the wood using the template 20 to guide the router, the template 20 is removed and the second template 22, having the same dimensions in length and width (L and W) as the first template 20, is located in the same location as the first template 20. The left end portions 32 of the template 22 overlap with the previously cut vertical groove 30. Therefore, when the second template 22 is utilized along with the router, the router bit can be positioned into the previously cut groove and the islands 26 are completed utilizing the second template 22 such that the letter B has islands 26 with continuous perimeters.

The same two pass system is utilized for characters having islands which include the letters A, B, D, O, P, Q, R in the English alphabet; the numbers 4, 6, 8, 9, 0 and the symbols #, &, @. However the kit could be utilized to form other letters, numbers or symbols. The templates for each of the above letters, numbers and symbols include two templates that are configured to have overlap when positioned in the same location such that the router bit can be placed in the preexisting routed groove formed utilizing the first template when forming the second portion of the letter, number or symbol.

However, other letters, numbers and/or symbols, besides letters A, B, D, O, P, Q, R in the English alphabet; the numbers 4, 6, 8, 9, 0 and the symbols #, &, @, that include an island may also be routed utilizing the same two step or sequential process using at least two templates to form a single letter. While a two step sequential process is disclosed, it is contemplated that more than two templates may be utilized to form a letter, number or symbol having an island with an uninterrupted perimeter.

The kit includes a guide bushing that is configured to be secured to the router bit to prevent the router bit from gouging into the templates. The guide bushing is typically constructed from a softer metal, such as brass, to prevent erosion of the template surfaces. The guide bushing has a diameter that is about equal to the distance across the template from one edge to the other edge. The guide bushing can therefore be used with the template to guide the router to form the letters, number and/or symbols.

The interlocking templates 10, 20 and 22 include a front surface 50, and a back surface 52 that are substantially parallel to each other. The templates 10, 20 and 22 are typically manufactured from a polymeric material utilizing a molding process and/or a stamping process.

Each of the templates 10, 20 and 22 includes upper and lower left dovetail indentions 54 that accept complementary dovetail tabs 56 extending from the right side of the adjacent template 10, 20 and 22. The placement of the dovetail tab 56 within the dovetail indentions 54 secures adjacent templates together. However, other connecting mechanisms are also contemplated.

Figure 2:
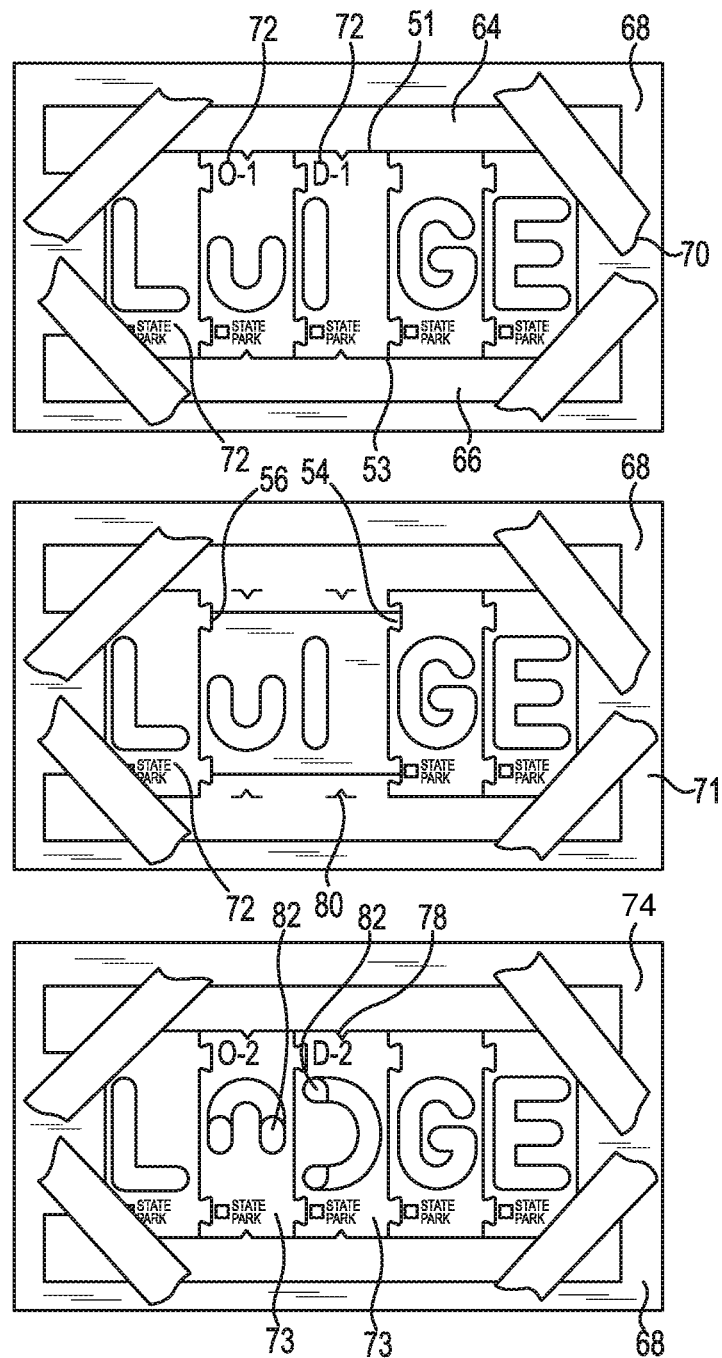
FIG. 2 is a schematic illustration of a sign being routed utilizing multiple templates and multiple passes to create letters with islands having continuous perimeters.

Referring to FIGS. 1 and 2 each of the templates 20 and 22 that are used a sequence can optionally include a notch 58 on a top and bottom surface 51 and 53, respectively. The notches 58 are located substantially at a center line of the template 20 and 22 that can be marked on the piece of wood or a piece of paper or other material positioned on top of the wood to allow the second template 20 or 22 to be precisely positioned in the same position as the first template 20, 22 by aligning the notch 58 with the mark. The notches 58 can be located anywhere along the top and bottom surfaces 51 and 53, provided the notches 58 are in the same location on each of the templates, as the notches 50 and the marking ensure proper placement of the second template 22 after the first template 20 removed.

By way of example, referring to FIG. 2 a schematic illustration provided how to utilize the kit to route a word having letter with islands into a piece of wood 68. As illustrated, the exemplary word that is routed into the piece of wood is the word "LODGE". In the word LODGE, both the letters "O" and "D" include an island that will be routed into the wood using two templates for each of the letters.

Prior to placing the templates on the piece of wood, spaced apart segments of a piece of paper or tape 64, 66 are optionally placed on the wood piece such that the upper and lower edges 51 and 53 of the templates are positioned on the segments 64 and 66. The letters L-O-D-G-E are then aligned and the templates are interconnected utilizing the dovetail indentions 54 and the dovetail tabs 56. As the letters O and D both include an island, a sequencing of cuts with the router must be utilized in order to route letters O and D with a continuous island to provide a more professional appearance.

In the illustration 70, the individual templates 72 are interconnected utilizing the dovetail indentions 54 and the dovetail tabs 56. The corners of the connected templates 72 are retained with segments of pressure sensitive adhesive tape to prevent movement of the interconnected templates 72. The letters L, G and E are routed into the wood using a router and the templates. First portions of the letters O and D are also routed into the piece of wood 68.

However, because there is an island in the letters O and D in "LODGE", a series of templates is be utilized to create each letter. In order to create or precisely locate the templates 72, an outline of the notches 80 is typically marked on either the wood 68, or in this instance the paper or tape segments 64, 66, as depicted in illustration 71. Referring to illustration 74, the template 72 is then removed and replaced with the template 73. The notch 78 in the template 73 is aligned with the marking 80 to ensure the template 73 is in the previous location of the template 72. With the template 73 replacing the template 72, there is an overlap 82 between the groove formed utilizing the first template 72 and the second template 73 such that the router bit can be easily placed into the preexisting cut to create the second cut and form the letters O and D having a continuous perimeter.

Figure 3:
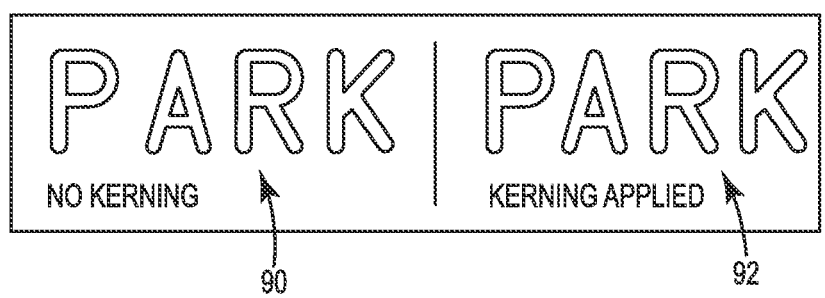
FIG. 3 is a comparative illustration showing a sign where the letters have no kerning versus a sign where letters having kerning.

Referring to FIG. 3, a comparative illustration of signs 90 and 92 with letters routed utilizing the disclosed kit is illustrated for the word "PARK" with and without utilizing kerning between the letters P and A. The word "PARK" 90 does not include kerning and as can be seen, there is a significant space between the P and the A which does not have a professional look or appearance. Utilizing the method and kit of the present disclosure, kerning can be applied to routed letters to create a more professional appearance of the mark as illustrated by the word "PARK" 92 where the spacing between P and A has been reduced. What is meant by kerning is the spacing between letters in a word.

Referring to FIG. 4, a sequence of template configurations utilizing a kerning spacer is illustrated for the letters P and A. Kerning is typically utilized where the letters have a large top and a small bottom width or vice versa. As the width of a letter is larger at the top or bottom, then the letters can be placed closer together. Typical letter combinations that require kerning include: AT, AV, AY, FA, FJ, LT, LB, LY, PA, PJ, TA, TJ, VA, VJ, YA, and YJ. Combinations of these letters can also require kerning up to four letter combinations of any of the letter combinations.

In order to provide proper kerning for a two letter sequence, a first kerning spacer 100 is utilized along with one of the templates 102 for the letter A. A first kerning spacer 100 has a width that is less than a width of a standard template 102, and is about 75% of the width of the standard template. As illustrated, the kerning spacer 100 is utilized in place of the P for the letters PA for the first and second passes. Because the letter A includes an island, the template 102 is replaced with the template 104 and route to form the letter A. After A has been formed by a router utilizing the templates 102 and 104 in sequence, the kerning spacer 100 is aligned with the position of an outer edge 106 of the templates 102 and 104 for the letter A and an outer edge 109 of the template 108 is aligned with the position of an outer edge 105 of the kerning spacer 100 on the workpiece. After making the first routing pass, the template 108 is removed and replaced with the template 110 to form the letter P with the uninterrupted perimeter. Utilizing the kerning spacer 100 allows the letters P and A to be position closer together to form a more professional look.

Referring to FIG. 5, a three letter sequence is illustrated kerning for the letter sequence PAT. When an interior letter of a letter sequence requires kerning, a second spacer 120 is utilized to create the proper kerning space between outer letters and the middle letter. A width of the second kerning spacer is about two-thirds the width of a standard template and less than the width of the first kerning spacer 100. The sequence of templates 122, 120 and 124 are connected and a left and right side edges 126 and 128 of the sequence of templates on the workpiece are identified and marked. The outer letters are routed into the workpiece using the templates 122 and 124. The template 122 is replaced with the template 123 to form the letter P due to the existence of an island.

Once the outer letters have been formed, the templates 120, 123 and 124 are removed and the template 123 is replaced with a first kerning spacer 100 having a width that is greater than a width of the second kerning spacer 120 and the template 124 is replaced with another first kerning spacer 100. A standard template 130 replaces the second kerning spacer 120. The width of the combination of the two first kerning spacers 100 and the standard template 130 is the same as the width of the combination of the templates 120, 122 and 124, such that middle letter is properly position between the outer letters utilizing kerning. In this instance the template 130 is replaced with the template 132 to form the island in the letter A with a continuous perimeter.

Referring to FIG. 6, a four letter sequence with kerning is illustrated where kerning is provided between the second and third letters. In this illustration, the sequence of letters are PATA. In order to create the letters with kerning, a first kerning spacer 142 and a second kerning spacer 144 are placed adjacent to each other and between the left right exterior letter templates 140 and 146. Left and right edges 150 and 148 of the interlocked templates 140-146 are located on the workpiece. The exterior letters are then formed using two templates in sequence to form uninterrupted islands in the letters P and A by replacing the template 140 with the template 141 for the letter P and replacing the template 146 with the template 147.

The alignment of the templates is the rearranged where the first template 140 is replaced with the first kerning spacer 142 and a template 152 is positioned between the first kerning spacer 142 and the second kerning spacer. The letter A is then formed with the template 152 that is sequentially replaced with the template 154 to for the letter A with an uninterrupted island.

To route the letter T, the series of templates is realigned such that the first template 141 is positioned at the edge 150 and the first kerning template 142 is positioned at the right edge 148. The second kerning spacer 144 is positioned between the first template 141 and a standard template 156 for the third letter T.

Figure 7:
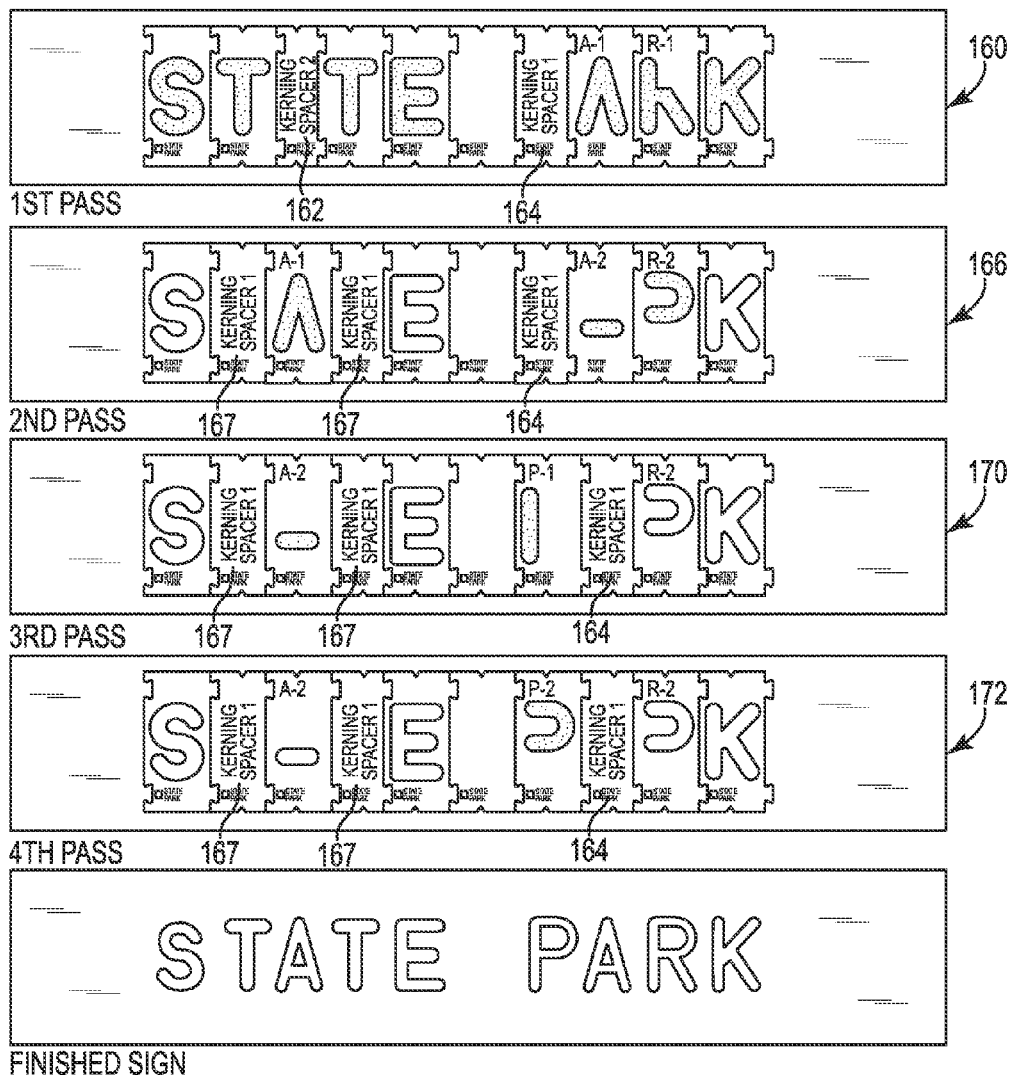
FIG. 7 is a schematic illustration of a sign utilizing two words utilizing kerning and a sequence of templates for routing letters with an island in a sequence to form an uninterrupted perimeter about the island.

Referring to FIG. 7, the passes required to route the words STATE PARK on a workpiece are illustrated. Kerning is utilized on the sequence "TAT" in the word STATE and kerning is utilized on the letter "PA" in the word park. The sign is routed using the sequences described with respect to FIGS. 4 and 5.

In the first pass 160, the letter A is replaced with the second kerning spacer 162 and the letter P is replaced with the first kerning spacer 164. The letter or portions of letters are routed into the workpiece. In the second pass 166, the letter A in park is completed with the second template, and the first template for the letter A in the word STATE is inserted into the row of templates along with left and right first kerning spacers 167.

In the third pass 170, the first template for the letter A in STATE is replaced with the second template to form the letter A with an uninterrupted island and the first kerning spacer 164 replaces the letter A in PARK and the first template for the letter P is connected to the first kerning spacer 164. After routing the first portion of the letter P, the second template replaces the first template, and the letter P is completed to route the island with an uninterrupted perimeter in a fourth pass 172.

Although the present invention has been described with reference to preferred embodiments, workers skilled in the art will recognize that changes may be made in form and detail without departing from the spirit and scope of the invention.

What is claimed is:

1. A kit comprising:
 a plurality of templates for letters, words and symbols utilized to route letters into a workpiece, wherein the plurality of templates includes at least two complementary templates for each of the letters, words or symbols having an island where each of the two complementary templates defines a portion of a border of the island and wherein each of the plurality of templates have a first length and a first width; and at least one first kerning spacer wherein the first kerning spacer has a second width that is less than the first width.

2. The kit of claim 1 and wherein each of the plurality of templates comprises:

a first side edge having at least one indention; and a second side edge having at least one tab, wherein when templates are placed adjacent each other the tab fits within the indention to secure the adjacent templates together.

3. The kit of claim 2 and wherein each of the at least one indention has a dovetail indention and the at least one tab has a dovetail configuration.

4. The kit of claim 1 and wherein the two complementary templates comprise:

a top edge with a notch, and a bottom edge with a notch.

5. The kit of claim 1 and further comprising at least one second kerning spacer wherein the second kerning spacer has a third width that is less than the second width of the first kerning spacer.

6. The kit of claim 1 and wherein the two complementary templates for each of the letters, words or symbols having an island are configured to be provided with an overlap in the templates for forming the letters, words or symbols.

7. The kit of claim 1 and further comprising a guide bushing configured to be secured to a router bit, wherein the guide bushing is configured to guide the router in the template and prevent the router bit from gouging into the templates.

* * * * *